Patented July 28, 1931

1,816,242

UNITED STATES PATENT OFFICE

WILLIAM BURTON WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS

RUBBER EMULSION AND PROCESS OF MAKING THE SAME

No Drawing. Application filed November 18, 1922, Serial No. 601,909. Renewed December 1, 1926.

This invention relates to rubber emulsions and processes of making the same; and it comprises as a new composition of matter a concentrated and purified stable preparation of latex containing caoutchouc particles in substantially the same chemical and physical condition as in the original latex, that is, not coagulated, but containing a less ratio of proteids and other soluble matters to caoutchouc than that normal to latex, said preparation being of a butter-like consistency, of standardized composition, stable in transport and storage and having a distinctly alkaline reaction; and it further comprises a process of producing such a composition wherein latex is passed through a centrifugal separator of the continuous type to separate much, or most, of the contained watery component under conditions precluding any violent impact or agitation and is discharged therefrom in such a manner as to have a progressively arrested discharge velocity, the material in its passage through the centrifugal device being usually, but not always, washed somewhat with water or other liquids in order to diminish still further the ratio of proteids and contained solubles to caoutchouc, the emulsion being stablized during the operation by a small addition of an alkaline body, such as ammonia; all as more fully hereinafter set forth and as claimed.

Latex is the name given to the milky sap of many plants and particularly that produced from the Hevea family. It is a white, milky liquid containing from 20 to 30, and sometimes as high as 32, per cent of caoutchouc, or a substance which becomes ordinary caoutchouc (rubber) on coagulation. This caoutchouc exists as finely divided particles or globules emulsified or suspended in a watery liquid which may be here called the "serum". The particles range in size from ultra-microscopic to a maximum of perhaps 5 mu in natural latex (Hauser "Latex", Dresden, 1927, page 56). It is quite seldom that particles with a longitudinal diameter as high as 6 mu are found. On any coalescence of the dispersed particles, coarser aggregates are formed and these may vary from a size around 6 mu (which is not too great for the present purposes) to large clots. Most commercial latex contains a little coalesced material (often commercially called "cream"); the quantity varying from wholly negligible amounts to a maximum of perhaps 3 to 5 per cent (on the rubber) in latex acceptable for the present purposes. Some question exists as to whether the minutely divided material in the latex which becomes caoutchouc or rubber on coagulation is itself actually caoutchouc. For the present purposes, however, it is convenient to call it caoutchouc. In the latex, in addition to the caoutchouc, there are present resins, proteid bodies, carbohydrates and other normal constituents of vegetable saps, the liquid being of quite complex nature. The latex as collected is not of any constant composition but varies within rather wide limits; not only as regards the caoutchouc but as regards the other constituents as well; it does not contain fixed proportions of soluble non-caoutchouc bodies (carbohydrates, proteids, etc.). It is quite unstable in its nature readily clotting or coagulating on agitation or in the presence of many chemical agents; a fact upon which depends the usual methods of making raw or crude rubber. The latex is treated with various acids, with creosote, etc., giving a coagulum of raw or crude rubber. In coagulating, the action apparently starts from a focus or foci; the action is localized and the coagulum is reticulate or stringy in its nature. The behavior of the latex on coagulation is, to some extent, conditioned on the presence of the non-caoutchouc components. It is sometimes thought, and possibly correctly, that the coagulation of the rubber is really a co-coagulation of proteids and caoutchouc. In coagulation, however, for the most part, the uncoagulated bodies do not go with the rubber produced, but remain in the liquid. The coagulation is, to some extent, a purifying operation. Much of the soluble impurities which remain with the coagulated caoutchouc can be removed therefrom by washing on mills.

As stated, the condition, physical or chemical, in which caoutchouc exists in the latex is not well understood; but apparently the caoutchouc is present as an almost indefinitely fine emulsion or suspension; an emulsion so fine that in many respects the latex presents the properties of a true solution. It will diffuse, it is taken up by capillary pores, passing readily through medium filter paper, etc. On drying down the latex under conditions precluding coagulation, it solidifies to a gel, this gel being of the irreversible type; and on further drying, the gel becomes a tough, resilient, homogeneous material, differing quite markedly in character from the non-homogeneous and reticulate material produced in coagulation. It is much more readily reactive with sulfur than is raw rubber produced by coagulation; on vulcanization in fact behaving more like long milled rubber than like raw rubber. And by reason of the high state of sub-division in which the caoutchouc exists in the latex, the latex can be used to effect much more intimate and thorough impregnations of fibrous articles than is possible with any type of rubber or rubber preparation (including the so-called "rubber solutions") formed with rubber which has been produced by coagulation. "Rubber solutions" will not enter and pass through the capillaries of ordinary fibrous bodies whereas normal latex will. These properties render the latex of considerable value for impregnating fibrous bodies and for other technical uses. The latex can, for example, be used for strengthening paper by impregnation in a manner which I have elsewhere described and claimed (Serial No. 599,444, filed November 6, 1922). In such uses of latex, the presence of the other bodies associated with the caoutchouc in latex may or may not be desirable; this being particularly true of the proteids. The presence of as much soluble proteid as is contained in the natural latex is quite frequently undesirable. Where latex is used to produce a gel, there is no separation of the accompanying matters from the caoutchouc, as in coagulation. They remain in the gel. Some of these substances which are associated with the caoutchouc in the dried gel are water-soluble and some are not. Washing of the latex impregnated articles is rarely, if ever, practicable and in any event, since the latex on drying becomes a homogeneous gel, is not particularly efficient in removing these substances. Nor is it always desirable to remove all these bodies; some of them being advantageous components of the dried gel under some conditions of use.

In all such uses of latex its irregular character is inconvenient and it is desirable to have a latex of standardized composition, not only as regards the amount of caoutchouc present, but also as regards the character and amount of other latex solids. And it is further desirable, for the reasons stated, that the composition of the latex be adjusted as regards these other solids. It is one of the purposes of the present invention to produce latex standardized, not only as regards the concentration of caoutchouc therein, but also as regards the other bodies. It is desirable to produce a rubber emulsion of considerably purer character than that present in latex; that is, containing substantially less proportions of dissolved carbohydrates and proteids.

Because of the sensitive character of the latex and its characteristic properties, however, it has hitherto not been considered practicable to concentrate it or purify it. In the present invention, however, I have devised a simple, economical and ready method of producing the desired concentrated, standardized and purified latex.

I have found that if I pass latex through a rapidly revolving centrifugal separator of the continuous type of the general character of those used for separating cream and milk, under certain precautions I can effect a considerable segregation of the watery fluid or serum from the emulsion, with production of a concentrated emulsion. In so doing, since the proportion of serum is lessened in the thickened emulsion, there is a much lower ratio of soluble proteids, etc., to caoutchouc than in the original latex. Under the influence of centrifugal force, the latex segregates into two annular layers in the machine, the inner being of rich caoutchouc emulsion, while the outer is free, or substantially free, of caoutchouc. Under the conditions used caoutchouc does not separate as such.

As so far described, the product from the centrifugal is a purified and concentrated latex in which, however, the composition of the remaining serum is the same as in the original latex. The ratio of total soluble proteids, resin, etc., to caoutchouc is, of course, lessened; but the composition of the liquid carrying the caoutchouc, insofar as it remains, is the same as in the original latex. By proper adjustment of working conditions the product can of course be standardized as regards the percentage of caoutchouc present, since it is possible to discharge from the centrifugal an emulsion of any strength which may be desired.

It is possible by an extension of the invention, as so far described, to produce latex preparations or rubber emulsions in which purification and standardization have been carried still further. In the centrifugal separator, as stated, the latex forms an inner layer of concentrated latex and an outer layer of serum. This inner or latex layer can be washed to any extent desired during the operation itself by a proper supply of water to the inner liquid wall. In so doing, the concentration of non-caoutchouc matters in the liquid forming the "outer phase" of the caoutchouc emulsion, can be materially lessened. The added water mechanically dilutes and displaces the serum which bathes the suspended caoutchouc particles of the emulsion. By this dilution of the serum with water, the liquid emulsion assumes quite different properties as regards coagulating agents, drying, etc. There is a limit, however, beyond which it is not advisable to go in washing, unless something more be done. With a simple washing operation, I do not ordinarily desire to completely remove all the serum solids. Some proportion of these solids is apparently necessary to maintain the emulsion, and if washing be carried too far, the indefinitely fine caoutchouc globules tend to coalesce to coarser agglomerates. But if the centrifugal operation and the washing be carefully conducted, the washing not being too drastic, a thickened product is obtained in which the caoutchouc particles are still emulsified and have apparently their original condition or state; the thickened product yielding on the addition of water a material which is substantially like the original latex, save that it is considerably purer as regards the soluble bodies associated with the caoutchouc in normal latex. Washing is advantageous in producing a standardized latex. By control of the washing in connection with the original composition of the latex, a concentrated purified latex can be produced with a substantially constant ratio of non-caoutchouc bodies to caoutchouc. As so far stated, however, these non-caoutchouc bodies associated with the caoutchouc are the same as those in the original latex.

In a further extension of my invention, however, I can produce a further purification and standardization of the latex by the expedient of substituting other liquids for the diluted latex serum maintaining the emulsion, thereby diminishing to any extent desired the proportion of non-caoutchouc bodies to the caoutchouc. In so doing, whatever the composition of the original latices, and these, as pointed out, vary considerably, the product may be made the same. A large number of alkaline reacting liquids have the property of maintaining the rubber emulsion. The permanency of the rubber emulsion of latex is by no means conditioned upon the presence of the original soluble non-caoutchouc bodies, such as proteids, but can be maintained by other substances. There is a considerable advantage, for many purposes, in removing these soluble proteids and other bodies. The proteids of the latex, or any large proportion of them, are not always desirable components of the dried latex gel, as has been said.

Of the alkaline-reacting liquids which can be used to replace the serum in maintaining the rubber emulsion, weak ammonia is the most convenient. Being volatile, its presence does not interfere with subsequent operations in which the dried gel is produced and used. However, borax, sodium citrate, sodium phosphate and even sodium carbonate or potassium carbonate, may be employed. In no case is it necessary to have large amounts of alkali present. About 2 or 3 per cent of ammonia suffice.

In practical embodiments of my invention, where rubber emulsions are to be produced with all or most of the natural serum solutes removed, the thickened liquid, more or less washed, coming from the centrifugal is treated again by a washing operation, using as a washing liquid that which is to replace the serum liquid. This second treatment may be performed in another centrifugal or, by suitable modification of the machine, it may be performed in the same centrifugal in which concentration and the first washing are effected.

In substituting an alkaline liquid for the serum, the emulsion is treated with an alkaline solution in the same way as described with water. The alkaline liquid dilutes and displaces the serum to such an extent as may be desired. It has, incidentally, a purifying effect in that, in addition to displacing the serum solution, it takes into solution a certain amount of acid impurities (resins, etc.). It is frequently advantageous to utilize this purifying property of alkaline solutions, washing the emulsions more or less thoroughly with an alkali solution prior to adding the liquid which is to form the "outer phase" of the final stabilized, purified rubber emulsion. For example, the latex may be first concentrated by centrifugal action in the way described, then washed with a weak solution of, say, sodium carbonate, to remove acid impurities, and finally the sodium carbonate replaced by a weak solution of ammonia. This gives a pure, stable rubber emulsion, free of acid impurities as well as of the natural solutes of the natural latex.

In the described operation, a number of precautions are desirable. If latex be violently agitated, the rubber particles or globules of the emulsion are apt to coalesce to a greater or less extent, coarsening the emulsion and preventing complete redispersion on dilution to a stable preparation, or destroying it altogether, as the case may be; this tendency being much more apparent with some latices than with others. This tendency toward coalescence increases with concentration. In the thickened latex, the caoutchouc particles are in close mutual proximity and therefore undergo coalescence more readily. The centrifugal separator used should be so constructed and its operation be such as to avoid any violent agitation or stirring of the latex. The latex must be submitted to extremely rapid rotation but it should not be unduly agitated in so doing. In practice, I use a somewhat modified liquid separator of the type used in cream separators, but not containing a liner; and I feed the latex in a slow stream non-radially and in the direction of movement of the rotating annular wall of liquid; the object being to have the incoming latex join the the wall with the least possible local impact or agitation. If a bottom feed type of liquid separator be used, the upper portion of the machine may be provided with radial wings but the lower portion should be free from obstruction. The caoutchouc particles in the thickened latex coming from the apparatus are apt to coalesce by impact or agitation; and I so construct my discharge receiving device as to arrest the motion of the outgoing stream of latex slowly and progressively. It is not advisable to suddenly arrest the motion of the forcible stream issuing from the centrifuge. A machine suitable for my purposes is described in my Patent, No. 1,630,412, granted May 31, 1927.

In the concentrated latex as it passes from the machine in the event that no water is used for washing, as stated, the caoutchouc particles or globules are in their original condition; and they are held in suspension by a liquid of the same character as that present in the original latex. This watery liquid is however present in much less volume; the caoutchouc particles are, so to speak, spaced and united by mere films of serum. Because of their proximity, as stated, the preparation is more susceptible of coalescence than the original latex. Where washing is resorted to and concentration of the serum thereby reduced and no replacement of serum by other liquid is effected, the risk of coalescence is still greater. Therefore, under these circumstances, I ordinarily at once add to the thickened latex, which emerges from the apparatus as a thick creamy or buttery mass, a certain proportion of an alkaline body to act as a stabilizing agent. Where the concentration of the serum has been reduced by washing, I ordinarily add a somewhat greater proportion of the stabilizing agent. As a stabilizing agent, any one of a large number of alkaline or alkaline-reacting substances may be used; but in practice I ordinarily employ ammonia. Where these stabilizers are to be used, retention of some residual serum in the liquid becomes of less importance; and complete, or practically complete, washing may be effected in the centrifugal. In this event, however, it is desirable to add some proportion of stabilizer in the apparatus itself.

The thickened preparations obtained under the present invention may be regarded as true rubber emulsions. They may have the "outerphase" of the emulsion of the same composition as the serum of the original latex, save for the presence of the added stabilizer; or they may have this serum diluted by water; or they may have the serum wholly or in part replaced by other liquids. The composition and, correspondingly, the properties of the various preparations under the present invention, differ to this extent. They are all however to be regarded as purified and standardized, uncoagulated and uncoarsened concentrated latex preparations or rubber emulsions. They differ from the original latex, not only as regards concentration, but also in the character of the outer phase. In part, this difference in character is due to the difference in ratio between the caoutchouc and other solids. This difference in character is substantial. Some coagulating agents which readily effect clotting or coagulation of the original latex do not affect the present emulsion. The difference in character of the outer phase is of course accentuated where the non-caoutchouc constituents of the original serum are wholly, or practically wholly, removed, as they may be considered as emulsions however, they are like the original latex, save as regards concentration; they have the same dispersibility in water and are not coarsened; there is no substantial coalescence of the rubber particles to coarser aggregates during their manufacture.

In a general way, for materials which are to be vulcanized and particularly in conjunction with milled rubber, it is advantageous to remove the natural non-caoutchouc solids of the latex as far as possible. Caoutchouc from dried gel, with or without the other solids of the latex, possesses many advantages over caoutchouc from coagulation, both in its chemical and its physical properties. It takes up large amounts of sulfur, resembling in this respect long milled rubber, rather than raw rubber or short milled rubber; and it is of much more uniform physical character, being free from the veins and reticulate structure of raw coagulation rubber. Purified rubber emulsions possess these advantages in greater degree than latex emulsions which are merely concentrated; with the further advantage that the purified emulsions are of standardized composition. This uniformity in character of the purified emulsions is highly desirable in processes involving vulcanization. With a removal of resin in purification, the character of the products obtained in vulcanization is further improved. In vulcanization, gel caoutchouc gives directly results which can only be obtained from coagulation rubber after washing and long milling.

What I claim is:—

1. As a new composition of matter, a rubber emulsion readily dispersible and stable in storage and handling, said emulsion representing a concentrated, purified and standardized latex containing caoutchouc in emulsified, uncoagulated, uncoarsened condition, substantially all of the dispersed particles being of about the same order of magnitude as in the original latex and being capable of entering capillaries, said emulsion being of thick consistency, being alkaline in reaction and being readily dispersible in water and capable of redilution to a permanent emulsion like that of the original latex and the aqueous phase containing less proportions of soluble non-caoutchouc solids than those normal to latex.

2. As a new composition of matter, a rubber emulsion readily dispersible and stable in storage and handling, said emulsion representing a concentrated, purified and standardized latex containing caoutchouc in emulsified, uncoagulated, uncoarsened condition, substantially all of the dispersed particles being of about the same order of magnitude as in the original latex and being capable of entering capillaries, said emulsion being of thick consistency, being alkaline in reaction and being readily dispersible in water and capable of redilution to a permanent emulsion like that of the original latex and the aqueous phase being substantially free of the soluble non-caoutchouc solids of normal latex.

3. The process of concentrating, standardizing and purifying latex which comprises exposing latex as a relatively quiescent mass to intense centrifugal action and during such exposure washing the latex and separating the enriched latex from the watery liquid.

4. The process of concentrating, standardizing and purifying latex which comprises exposing latex as a relatively quiescent mass to intense centrifugal action, substituting another liquid for natural liquid of the latex during such exposure and separating the enriched latex from the watery liquid.

5. The process of concentrating, standardizing and purifying latex which comprises passing latex through a continuously operating centrifugal under conditions precluding any violent agitation of said latex, separating the enriched latex from the watery liquid produced and discharging the enriched latex in such a manner as to avoid violent impact, the motion of the expelled latex being gradually arrested.

6. The process of purifying latex emulsions which comprises subjecting a continuously moving stream of latex to centrifugal force without substantial agitation to produce a liquid layer rich in caoutchouc-forming particles, and removing without substantial agitation the liquid layer so formed from the influence of centrifugal force to maintain the caoutchouc forming globules in substantially their original condition.

7. The process of purifying latex emulsions which comprises subjecting latex to a gradually increasing centrifugal force while maintaining the latex in a substantially quiescent state, separating a major portion of the watery liquid from the latex and concurrently washing the residue to displace the natural serum of the latex, and removing the concentrated liquid residue from the influence of centrifugal force without substantial agitation thereof.

8. The process of purifying latex emulsions which comprises subjecting a continuously moving stream of latex to centrifugal force under conditions precluding any violent agitation of the latex, separating an enriched rubber-containing liquid layer, washing the layer with water containing a protective ingredient and removing the washed layer from the influence of centrifugal force without violent agitation thereof.

9. The process of purifying latex emulsions which comprises subjecting a continuously moving stream of latex to centrifugal force, forming an enriched caoutchouc containing liquid layer, washing the layer with water to replace the natural serum of the latex, and removing the liquid layer so purified from the influence of centrifugal force while maintaining the layer in a substantially quiescent state whereby the caoutchouc particles contained in the layer are maintained in substantially their original condition.

10. The process of purifying latex emulsions which comprise subjecting a continuously moving stream of latex to a progressively increasing centrifugal force, separating an inner liquid layer enriched in emulsiform caoutchouc forming particles and concurrently washing the layer with water during the application of centrifugal force and removing the enriched and washed liquid layer from the influence of centrifugal force as an effluent and gradually decreasing velocity.

11. The process of purifying latex emulsions which comprises subjecting a continuously moving stream of latex to a progressively increasing centrifugal force without violent agitation of the latex, separating an inner liquid layer enriched in emulsiform caoutchouc forming particles and concurrently washing the layer and removing the enriched and washed layer from the influence of centrifugal force without violent agitation thereof as an effluent with progressively decreasing velocity.

12. The process of purifying latex emulsions which comprises subjecting a continuously moving stream of latex to a progressively increasing centrifugal force without violent agitation of the latex, separating an inner liquid layer enriched in emulsiform caoutchouc forming particles, replacing the natural serum of the layer with water and a protective ingredient, removing the enriched and washed layer from the influence of centrifugal force without violent agitation thereof and as an effluent with a progressively decreasing velocity thereby preserving the natural condition of the caoutchouc forming particle.

13. The process of purifying latex to make a concentrate of the rubber-forming particles of latex containing less than a normal amount of non-rubber constituents, which comprises subjecting a body of latex to the influence of centrifugal force, diluting the body with a liquid to displace the natural serum of the latex and to facilitate the concentration of the rubber-forming elements therein, removing the concentrate so formed, and subjecting it to the further influence of centrifugal force in the presence of a liquid added thereto to effect further concentration and purification of the rubber forming elements contained therein.

In testimony whereof, I have hereunto affixed my signature.

WILLIAM BURTON WESCOTT.